United States Patent [19]

Weaver

[11] Patent Number: 4,603,908
[45] Date of Patent: Aug. 5, 1986

[54] HYDRAULIC LIFT DECK UPLOCK MECHANISM

[75] Inventor: Leslie A. Weaver, Monticello, Ind.

[73] Assignee: Eugene A. LeBoeuf, Gary, Ind.

[21] Appl. No.: 655,850

[22] Filed: Sep. 27, 1984

[51] Int. Cl.[4] .................................................. B60P 1/34
[52] U.S. Cl. .................................... 298/17 R; 414/495
[58] Field of Search ............... 254/8 R, 45; 298/17 B, 298/17 MR; 414/495, 498

[56] References Cited

U.S. PATENT DOCUMENTS

| | | | |
|---|---|---|---|
| 3,651,970 | 3/1972 | Black | 414/498 X |
| 3,743,044 | 7/1973 | Scheele | 414/495 X |
| 4,061,353 | 12/1977 | Kingman et al. | 414/498 X |
| 4,474,526 | 10/1984 | Gevers | 414/495 X |

FOREIGN PATENT DOCUMENTS 55-83625  6/1980  Japan .................................. 298/17 B Primary Examiner—Joseph E. Valenza
Assistant Examiner—Janice Krizek
Attorney, Agent, or Firm—Edward W. Osann, Jr.

[57] ABSTRACT

A heavy duty tractor drawn lift deck trailer for transporting load holding pallet frame units each having a ground engaging support structure enabling it to be picked up for transport or dropped off for storage without need for additional equipment or personnel. The trailer features an over-center mechanical lock for the lift deck which will be power engaged as the lift deck is elevated into raised transport position and power released as the lift deck is permitted to descend to lowered loading position on the trailer support frame. The lock is connected between a point on the lift deck and a point on one of the trailer hinge panels and remains engaged when the lift deck is tilted for dumping.

15 Claims, 13 Drawing Figures

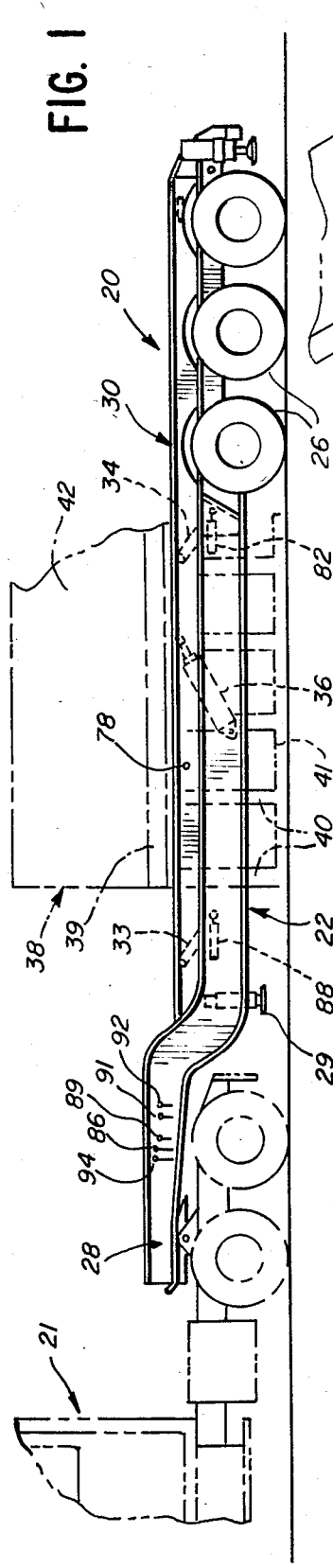
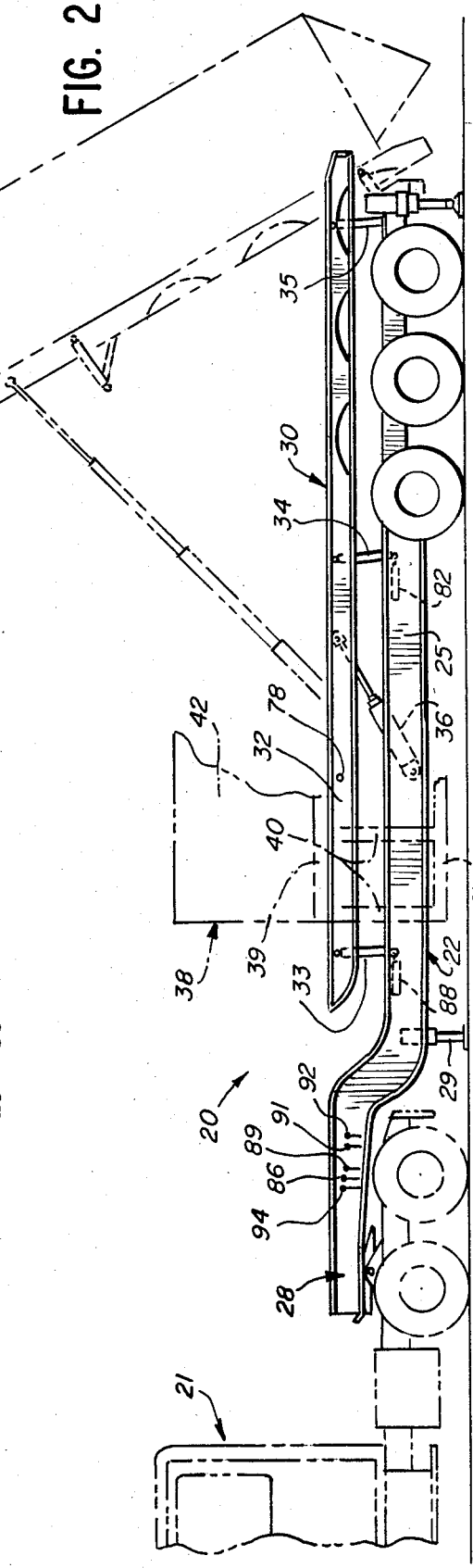
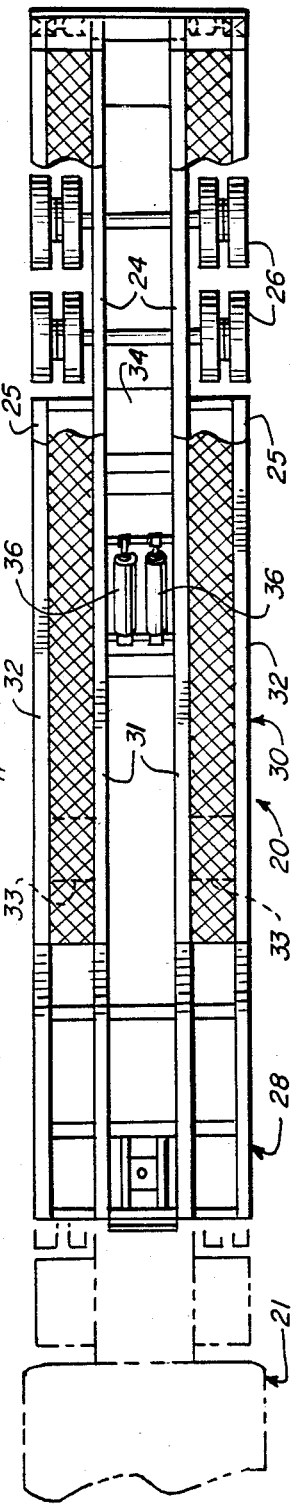

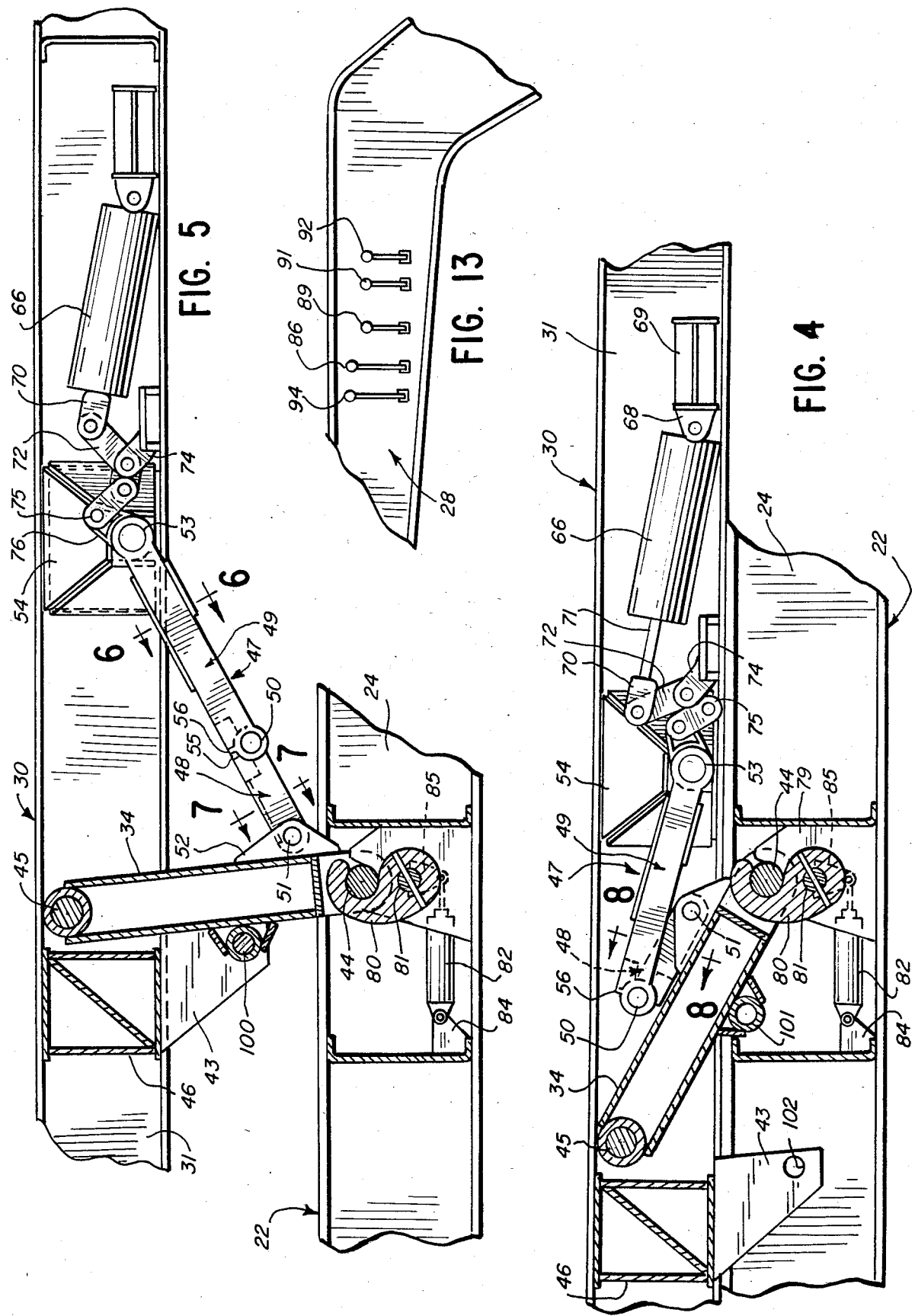

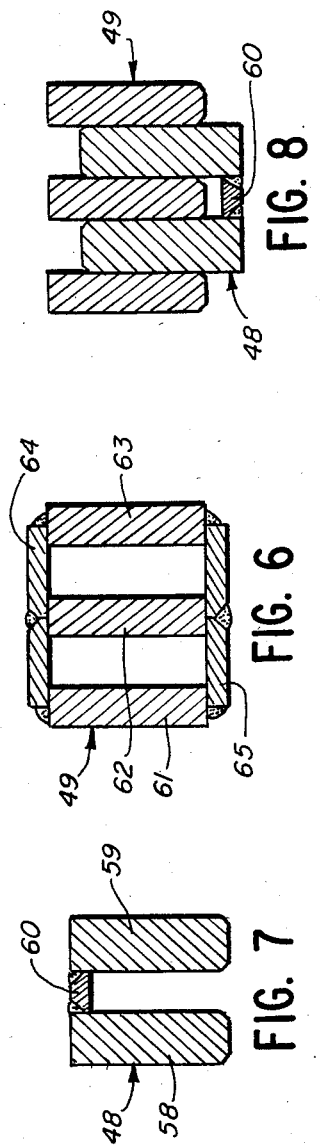
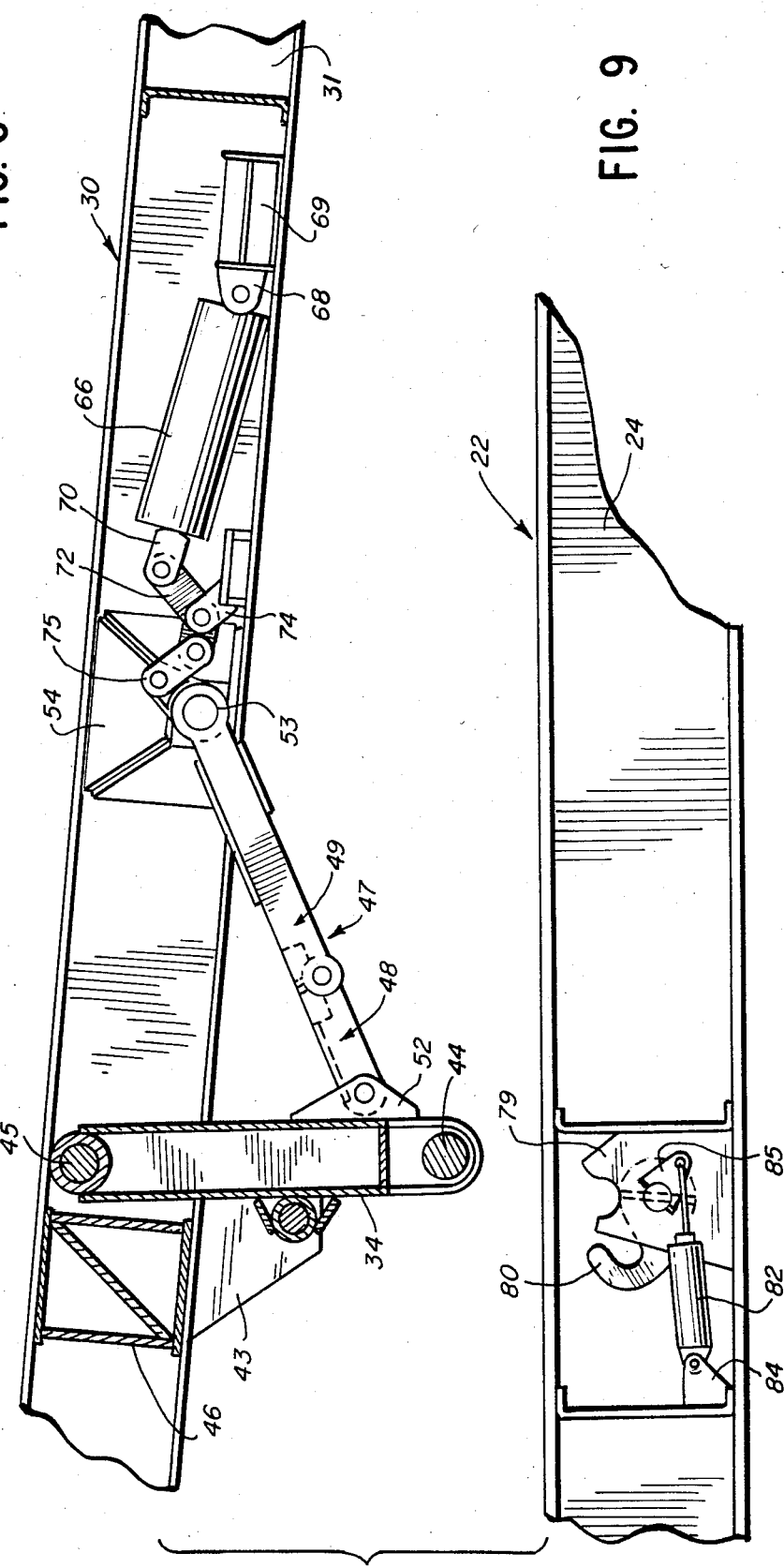

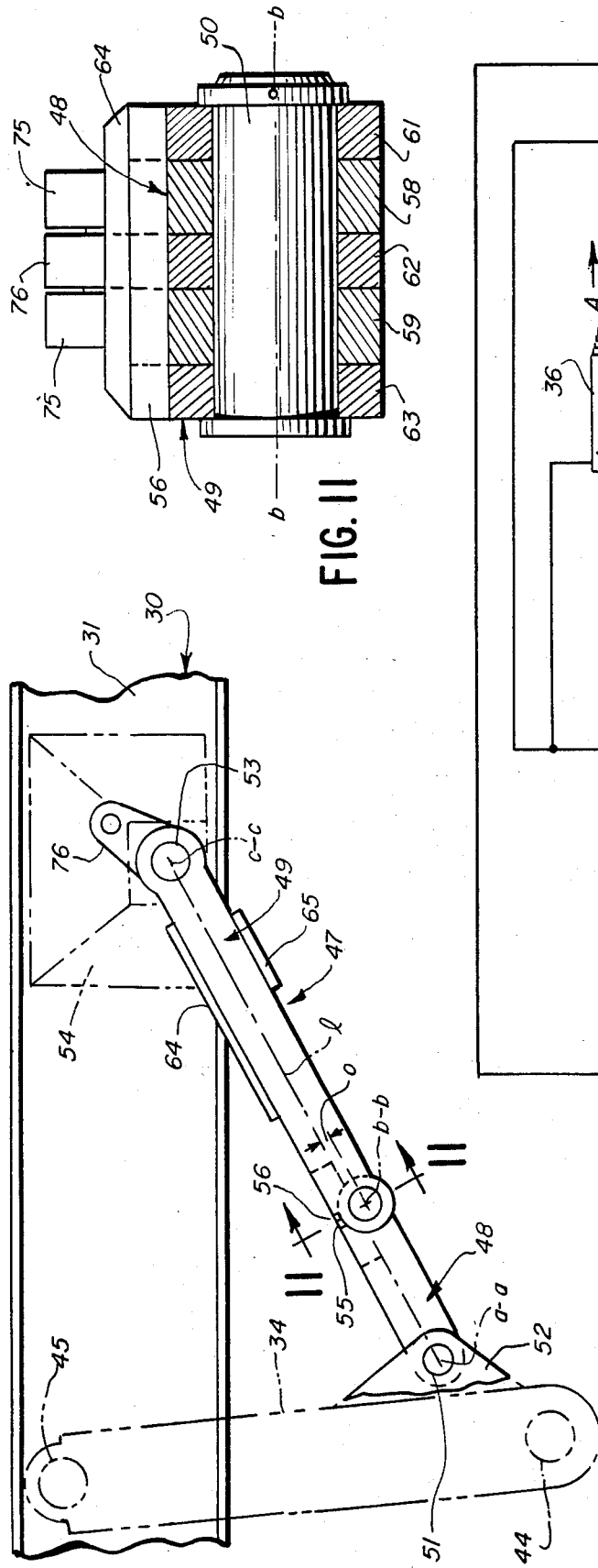
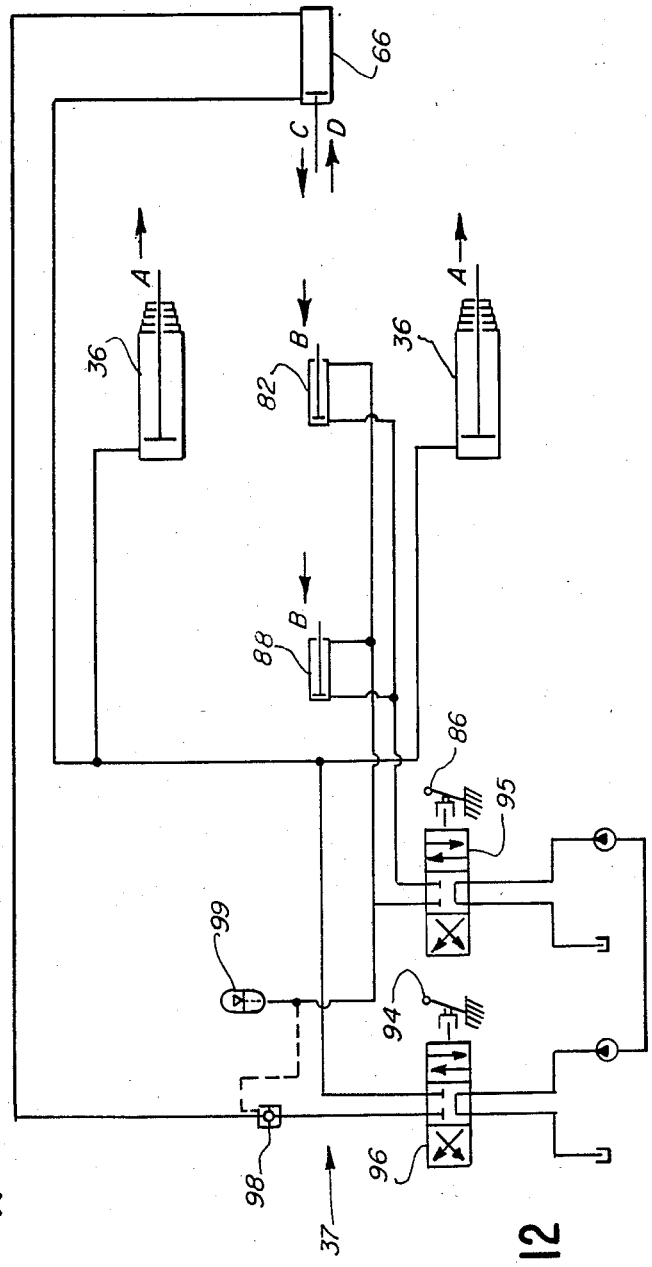
FIG. 11
FIG. 10
FIG. 12

HYDRAULIC LIFT DECK UPLOCK MECHANISM

BACKGROUND OF THE INVENTION

The present invention relates to the field of lift bed or lift deck vehicles and, more specifically, to heavy duty tractor-drawn lift deck trailers for transporting load holding pallet frame units. Each pallet frame unit has a ground engaging support structure enabling it to be picked up for transport or dropped off for storage without the need for additional equipment or personnel. This invention represents an improvement over the lift bed trailers disclosed in my copending application Ser. No. 315,437, filed Oct. 27, 1981, now U.S. Pat. No. 4,474,359 and in the copending application of David E. Gevers, Ser. No. 315,438, also filed Oct. 27, 1981 and now U.S. Pat. No. 4,474,526.

Trailers of this type are designed and built to carry heavy loads such, for example, as steel coils weighing approximately 60 tons. These loads are carried by the trailer with the lift deck and pallet frame unit in raised transport position. Heretofore, it has been necessary for the tractor driver to insert a long pin manually into the locking mechanism in order to secure the lift deck and load in transport position independently of the trailer hydraulic system. This requires the driver to reach under the lift deck when the latter is held in elevated position solely by the trailer hydraulic system. The driver is thus subjected to undue risk of injury in event of a sudden failure of the hydraulic system.

SUMMARY OF THE INVENTION

The general aim of the present invention is to provide a mechanical uplock mechanism for the lift deck of a tractor-drawn trailer that will be self-engaging as an incident to power elevation of the lift deck to transport position.

One object of the present invention is to provide an over-center mechanical lock for the lift deck of a tractor-drawn trailer which will be power engaged as the lift deck is elevated into raised transport position and power released as the lift deck is permitted to descend to lowered loading position on the trailer support frame.

Another object of the invention is to provide a mechanical lock of the character set forth above which can be disengaged only when the pressure fluid controls are set to lower the lift deck from raised transport position to its loading position on top of the support frame.

A further object of the invention is to provide a mechanical lock of the foregoing type adapted to coact with one of the hinge panels pivotally connecting the lift deck with the underlying support frame of the trailer.

Another object is to provide a mechanical lock of the type referred to above adapted to coact with one of the hinge panels and which will remain locked when the trailer lift deck is tilted for dumping.

Still another object is to provide a hydraulic control system for actuating a lock of the foregoing type in coordination with the other hydraulic components of the trailer.

The foregoing objects are accomplished in this instance by providing a self-engaging mechanical uplock linkage; connecting that linkage between a point on the trailer lift deck and a point on one of the trailer hinge panels, the latter being situated between the pivotal connections of the hinge panel with the lift deck and with the trailer support frame; connecting a double acting hydraulic actuator between the uplock linkage and a fixed point on the lift deck; and providing a hydraulic control system coordinating said double acting hydraulic actuator with the other hydraulic actuators on the trailer to release the self-engaging uplock linkage.

Other objects and advantages will become apparent as the following description proceeds, taken together with the accompanying drawings.

BRIEF DESCRIPTION OF THE DRAWINGS

FIG. 1 is a side elevational view of an illustrative lift deck pallet trailer embodying the present invention, the lift deck being lowered to loading position and straddled by a box-type pallet frame unit shown in phantom outline with its leg assembly resting on the ground.

FIG. 2 is a side elevational view of the illustrative trailer with the lift deck raised to transport position and the pallet frame unit also shown in phantom outline clear of the ground.

FIG. 3 is a plan view of the illustrative trailer as shown in FIG. 1 with the lift bed in lowered position for loading.

FIGS. 4 and 5 are enlarged, fragmentary vertical sectional views taken longitudinally of the illustrative trailer and showing the lift deck uplock mechanism in the unlocked and the locked positions, respectively.

FIGS. 6 and 7 are further enlarged transverse sectional views through the uplock mechanism taken in the planes of the lines 6—6 and 7—7, respectively, in FIG. 5.

FIG. 8 is an enlarged transverse sectional view through the uplock mechanism in folded condition taken in the plane of the line 8—8 in FIG. 4.

FIG. 9 is an enlarged, fragmentary longitudinal sectional view similar to FIG. 5 but showing the lift deck partially tilted toward dumping position with the uplock mechanism remaining fully engaged.

FIG. 10 is a further enlarged, fragmentary elevational view of the lift deck uplock mechanism showing the over-center offset linkage in locked position.

FIG. 11 is a further enlarged transverse sectional view taken through the over-center offset linkage in the plane of the line 11—11 in FIG. 10.

FIG. 12 is a diagrammatic view of the hydraulic control system of the trailer showing the manner in which the actuator for the uplock mechanism is integrated into the trailer control system.

FIG. 13 is an enlarged fragmentary view of the trailer gooseneck shown in FIGS. 1 and 2 detailing the various control levers associated with the hydraulic and air systems of the trailer.

While the invention is susceptible of various modifications and alternative constructions, a certain preferred embodiment has been shown in the drawings and will be described below in considerable detail. It should be understood, however, that there is no intention to limit the invention to the specific form described, but, on the contrary, the intention is to cover all modifications, alternative constructions and equivalents falling within the scope of the appended claims.

DETAILED DESCRIPTION

Referring more specifically to FIGS. 1–3, the present invention is there exemplified in a heavy duty lift deck trailer 20 such, for example, as the one disclosed in Gevers application Ser. No. 315,438, supra. The trailer 20 is adapted for coupling to a tractor 21 through a conventional fifth wheel connection. The trailer has a main support frame 22 defined by a pair of inboard longitudinal I-beam stringers 24, a similar pair of outboard stringers 25, and a plurality of cross members connecting the longitudinal stringers. The frame 22 includes a multiple wheel suspension 26 adjacent its rearward end and a gooseneck 28 at its forward end engaging the fifth wheel connection of the tractor. Landing legs 29, located slightly to the rear of the gooseneck, may be adjusted to hold the latter a suitable distance above the ground to permit ready engagement with the fifth wheel of the tractor.

The exemplary trailer 20 includes a lift deck or lift bed 30 which overlies that portion of the main support frame situated rearwardly of the gooseneck (FIGS. 1-3). The lift deck 30, like the support frame 22, has a pair of inboard longitudinal I-beam stringers 31, a similar pair of outboard stringers 32, and a group of cross members interposed therebetween. The deck 30 is pivotally connected to the support frame 22 by means of a series of hinge panels. The latter in this case consist of a pair of laterally spaced forward hinge panels 33, a center hinge panel 34 and a rear hinge panel 35 permitting the lift deck to be shifted between a lowered loading position where it rests on top of the support frame 22 to a raised transport position where it is situated several inches above the support frame 22. Power for shifting the lift deck from loading position to transport position is provided by a pair of telescoping main hydraulic actuators 36 incorporated in the trailer hydraulic system 37 (FIGS. 1-3 and 10).

The trailer 20 is adapted to transport loads through the use of pallet frame units 38, illustrated diagrammatically in FIGS. 1 and 2. In the present instance, each such unit comprises a raised platform 39 with depending legs 40 terminating in a pair of ground engaging skids 41. The pallet platform 39 may have a load receiving receptacle or box 42 fixed thereto. With the lift deck 30 in lowered position as shown in FIG. 1, the pallet frame unit is adapted to straddle the trailer which may be backed freely thereunder for loading. When the pallet frame unit 38 has been properly positioned lengthwise relative to the trailer, the lift deck 30 is elevated by the hinge panels and actuators 36 to raised transport position, lifting the pallet and its legs and skids clear of the ground. After transport in this condition to a destination, the lift deck is lowered until the skids 41 rest on the ground. The trailer may then be driven out from under the pallet frame unit and is ready to take on another load.

Provision is made in the trailer 20 for precisely defining the elevated transport position of the lift deck 30. This is accomplished by use of one or more buttress type stop abutments 43 mounted in depending relation on the lift deck for cooperation with an adjacent hinge panel. Referring more particularly to FIGS. 4 and 5, it will be noted that the center hinge panel 34 is connected to the support frame by lower pivot shaft 44, and is connected to the lift deck 30 by upper pivot shaft 45. A stop abutment 43 is mounted on the underside of a reinforced structural section 46 in the lift deck slightly forward of the upper pivot shaft 45. When the lift deck is raised from the loading position shown in FIGS. 1 and 4 to the transport position shown in FIGS. 2 and 5, the hinge panel 34 swings in a clockwise direction (as shown in those views) and the rear face of the abutment 43 moves toward the front face of the hinge panel 34 until the abutment and the hinge panel accost each other. At that point, the lift deck 30 has reached transport position. The parts are so constructed that contact between the abutment 43 and hinge panel 34 occurs at a point when the hinge panel is approximately 5° short of reaching a vertical position. Since the main power lift actuators 36 are single acting, this arrangement permits the lift deck 30 to return under gravity to loading position when the lift control valve relieves the lifting pressure on the actuators 36.

In accordance with the present invention, means are provided in the form of a mechanical lock 47 engageable by power to positively retain the lift deck 30 in elevated transport position by preventing rotation of a hinge panel relative to the lift deck upon arrival of the latter in that position. In further accordance with the invention, means are provided for disengagement of the mechanical lock 47 by power only when the hydraulic control system is actuated to lower the lift deck to loading position where it rests on top of the support frame 22.

Consistant with the foregoing objectives, the lock 47 comprises a pair of folding toggle links 48, 49 pivotally connected to each other as by means of pin 50 (FIGS. 5 and 10). The link 48 is pivotally connected as by pin 51 to a clevis 52 on the rear face of center hinge panel 34. The link 49 is pivotally connected, as by pin 53, to a pair of opposed pyramidal supports 54 projecting toward each other from the inboard longitudinal stringers 31 of the lift deck.

The mechanical lock 47 is constructed with an over-center feature and thus tends to remain fully engaged until a breaking force is applied thereto (FIGS. 5, 9 and 10). In this condition, the toggle links 48, 49 are aligned on a common longitudinal axis 1 extending between the rotational axis a—a of pin 51 and the rotational axis c—c of pin 53. The aligned position of the pivot links is defined by engagement of abutting stop 55 fixed to link 48 and a co-acting stop 56 fixed to link 49. In this condition, the connecting pin 50 and its rotational axis b—b are offset laterally from the axis 1 by an amount o which in the present instance may be approximately 0.5 inch.

In order to facilitate disengagement of the lock 47, the links 48, 49 are constructed and arranged to interleave when folded together about the connecting pin 50 (FIGS. 6-8 and 11). The link 48 thus comprises a pair of laterally spaced bar sections 58, 59 joined together by a connecting web 60 adjacent their upper edges. The link 49 comprises a set of three laterally spaced bar sections 61, 62, 63 joined together for portions of their length by top web 64 and bottom web 65. When rotated about the connecting pin 50 with their bottom edges approaching each other, the links interleave together as shown in FIGS. 4 and 8.

The lock 47 is preferrably actuated by application of power for both engagement and disengagement thereof. Power is obtained from a double acting fluid actuator 66 nested within the central portion of the lift deck adjacent the upper pin 53 of the upper pivot link 49 (FIGS. 4, 5, 9 and 12). The actuator 66 is pivotally attached at its fixed end to a clevis 68 rigidlly attached by bracket 69 to the lift deck 30. A cross head 70 on the outer end of actuator piston rod 71 is pivotally connected to a bell crank 72 rockably mounted on a bracket 74 fixed to the lift deck 30. The end of the bell crank 72 remote from the piston rod cross head 70 is pivotally connected by a pair of laterally spaced links 75 to a crank arm 76 intergral with the pivot link 49.

By reason of the construction just described, extension of the actuator piston rod 71 outwardly of the actuator 66 serves to disengage the lock 47 by folding the pivot links 48, 49 together as the lift deck 30 moves under gravity from elevated transport position, shown in FIG. 5, to lowered loading position, shown in FIG. 4. On the other hand, retraction of the piston rod 71 within the actuator tends to unfold the pivot links 48, 49 as the lift deck is power elevated toward raised transport position and to lock the links over center as an incident to arrival of the lift deck in raised transport position.

In accordance with a further aspect of the present invention provision is made for maintaining the lock 47 in fully engaged condition when the trailer is put through a dumping cycle and returned to raised transport position. As a preliminary to shifting into the dumping mode, the lift deck 30 is power elevated into raised transport position at which time it is still parallel to the main support frame 22. If a pallet frame unit 38 is on the lift deck, it is positively secured against longitudinal sliding motion as by means of air powered shot pin pallet locks 78, actuated by control lever 89 on the gooseneck, and pallet stops (not shown) at the rear of the lift deck. To facilitate dumping, the trailer 20 includes a plurality of quick detachment mechanisms on the main frame for uncoupling the lower pivotal connections of the central and forward hinge panels 34, 33. These detachment mechanisms are substantially identical to those disclosed and claimed in Gevers application Ser. No. 315,438, supra.

Referring first to the central hinge panel 34, the lower pivot shaft 44 of the latter is journaled in a pair of detachable bearings on the main support frame 22. Each bearing comprises a pair of laterally spaced saddle brackets 79 with upwardly facing grooves of semicircular configuration. A pair of retainer hooks 80, each with a throat of substantially semicircular configuration, is interposed between each pair of saddle brackets 79. The side walls of the hinge panel 34 are relieved adjacent their lower ends to provide clearance for the brackets and hooks 79, 80. The hooks 80 are fixed to a rocker shaft 81 extending through the saddle brackets and inboard stringers of the main frame. Hydraulic actuator 82 is pivotally connected at one end to an anchor bracket 84 on the main frame and at the other end to a crank arm 85 fixed to the rocker shaft. When operated by control lever 86 on the gooseneck, the actuator 82 is adapted to shift the hooks 80 between an engaged position, shown in FIGS. 4 and 5, and a disengaged position, shown in FIG. 9. In the later position, the hinge panel 34 may readily be lifted clear of the brackets 79 and retainer hooks 80.

The quick detachment mechanisms for the forward hinge panels 33 are closely similar to those for the central hinge panel 34 except for lateral spacing. The retainer hooks for engaging and disengaging the lower pivot shafts of the forward hinge panels 33 are operated by actuator 88 mounted in the main support frame 22. The actuator 88 is identical in construction and operation to the actuator 82 and is also controlled by the lever 86 on the gooseneck.

In order to compensate for uneven terrain during dumping, the trailer is equipped with a pair of hydraulically actuated ground stabilizers 29, one on either side of the main frame 22 at the rear (FIGS. 1-3). The stabilizers 29 are independently controlled, the one on the left being operated by control lever 91 and the one on the right being operated by control lever 92, both situated on the gooseneck (FIG. 13).

To initiate the dumping cycle, the lower pivotal connections of the center hinge link 34 and forward hinge links 33 are uncoupled by actuating control lever 86 on the gooseneck (FIGS. 9, 12 and 13). This, in turn, actuates control valve 95 which sends pressurized hydraulic fluid to the left hand ends of the hydraulic actuators 82, 88 (as viewed in the drawings), opening the retainer hooks 80 and releasing the hinge panels 34, 33 from the main frame 22. The control valve 96 is then opened by actuation of lever 94 on the gooseneck, causing the main hydraulic actuators 36 to extend further and rotate the lift deck and pallet about the lower pivot point of the rear hinge panel 35 (FIG. 2) to dump position. Meanwhile, the lock actuator 66 is held by pilot check valve 98 in retracted position with its piston rod fully withdrawn as shown in FIGS. 5 and 9, maintaining the lock 47 in fully engaged position throughout the dumping cycle. In this condition, the hinge panel 34, lift deck 30, and over-center engaged pivot links 48, 49 behave as a rigid triangular structure. As the lift deck returns to horizontal position following dumping, this triangular structure serves to position the lower pivot shaft 44 of the hinge panel 34 precisely in the semicircular seats of the saddle brackets 79. The forward hinge panels 33, being unlocked, utilize gravity to align their lower pivot shafts with the semicircular seats of their saddle brackets 79. At this point, the lift deck has returned to raised transport position parallel with the main support frame 22 and with the lock 47 still fully engaged.

After the forward and center hinge panels 33, 34 have returned to their lower pivot connections on the main frame 22, control valve 96 is momentarily shifted to neutral by the control lever 94. Control valve 95 is actuated by control lever 86 to retract actuators 82, 88 and thereby engage the retainer hooks 80 with the lower pivot shafts of the hinge panels resting in the saddle brackets 79. Control lever 86 and control valve 95 are held in this position until the retainer hooks 80 are fully engaged and pressure is built up on the lock side of the hydraulic system, including accumulator 99 and pilot port of pilot check valve 98. At this point, control valve 95 is shifted to neutral position by means of lever 86.

Pilot check valve 98 is now open for free flow in either direction. Further opening of control valve 96 by lever 94 to the down position will permit single acting main actuators 36 to drain to tank and lower the lift deck by gravity from transport to loading position. At the same time, hydraulic pressure is admitted to lock actuator 66 to cause the pivot links 48, 49 to hinge about their center pivot 50 and "fold", unlocking the center hinge panel 34 and drawing the lift deck downward into the loading position.

In order to facilitate an understanding of the trailer hydraulic system, FIG. 12 includes the following directional symbols for the hydraulic actuators there shown:

A→To raise lift deck to transport and dump positions.

B→To engage the retainer hooks for coupling the lower pivotal connections of the central and forward hinge panels to the main frame.

C←To break the over-center lock and add force urging lift deck to loading position.

D←To engage over-center lock as lift deck arrives at raised transport position.

As an optional feature, the trailer 20 may include a manually actuated lock to provide a backup against the possibility of a failure in the hydraulic system during transport. This is accomplished in the present instance by mounting a pair of laterally spaced locking sleeves 101 on the forward face of the center hinge panel 34. The spacing of the sleeves 101 is such that they straddle the adjacent buttress stop abutment 43 and register with a transverse aperture 102 in the buttress when the lift deck 30 is in transport position as shown in FIG. 5. At that point, a locking pin 100 may be manually inserted through the aligned sleeves 101 and locking aperture 102 in the buttress 43. The locking pin 100 may readily be removed when it is desired to lower the lift deck 30 to loading position.

What is claimed is:

1. A tractor drawn trailer for use with pallet frame units adapted to carry high tonnage loads and comprising, in combination:
   (a) a main support frame including means for direct connection to a tractor;
   (b) a lift deck mounted in superimposed relation on said main frame and adapted to support a pallet frame unit;
   (c) a plurality of hinge panels pivotally connected at their lower ends to said main support frame and at their upper ends to said lift deck constraining the latter to be raised and lowered in generally parallel relation with the former;
   (d) power lift means for raising and lowering said lift deck;
   (e) an uplock means including a pair of toggle links interposed between one said hinge panel and said lift deck, said pair of toggle links being pivotally interconnected;
   (f) said pair of pivotally interconnected links being constructed and arranged so that they define a self-locking relationship when said lift deck is in a raised transport position, and can be shifted to an unlocked relationship to permit departure from said raised transport position toward lowered loading position;
   (g) and a power actuator for moving said links of said uplock means into and out of their self-locking relationship.

2. The combination set forth in claim 1, wherein said power actuator is adapted to engage said uplock means by aligning said toggle links as an incident to arrival of said lift deck in transport position and to disengage said uplock means by folding said toggle links to permit departure toward loading position.

3. The combination set forth in claim 1, wherein said pivotally connected links have an over-center engaged position.

4. The combination set forth in claim 3 wherein said over-center engaged position of said pivotally connected links is defined by mating stop abutments.

5. The combination recited in claim 1, wherein said pivotally connected links are constructed with complementally spaced bar sections adapted to fold together in interleaved relation.

6. A tractor drawn trailer for use with pallet frame units adapted to carry high tonnage loads and comprising, in combination:
   (a) a main support frame adapted for connection to a tractor;
   (b) a lift deck mounted in superimposed relation on said main frame and adapted to support a pallet frame unit;
   (c) a plurality of hinge panels pivotally connected at their lower ends to said main support frame and at their upper ends to said lift deck constraining the latter to be raised and lowered in generally parallel relation with the former;
   (d) power lift means for raising and lowering said lift deck between an elevated transport position and a lowered loading position;
   (e) a mechanical lock comprising a pair of pivot links pivotally connected to each other;
   (f) means defining a pivotal connection between one said pivot link and one said hinge panel;
   (g) means defining a pivotal connection between the other said pivot link and said lift deck; and
   (h) a power actuator connected between said lift deck and said other pivot link for engaging and disengaging said lock.

7. The combination set forth in claim 6, wherein said other pivot link includes a crank arm extending radially with respect to its said pivotal connection, and said power actuator is interposed between said lift deck and said crank arm.

8. The combination recited in claim 6, wherein said pivotal connection between said pivot links is laterally offset from a straight line connecting the pivot axes of said other pivotal connections when said lock is fully engaged.

9. The combination defined in claim 7, and which further comprises:
   (a) a bell crank pivotally mounted on said lift deck and pivotally connected at one end to said acutator;
   (b) a pair of laterally spaced connecting links pivotally connected to the other end of said bell crank;
   (c) said connecting links also being pivotally connected to said radially extending crank arm.

10. The combination set forth in claim 6, wherein said power actuator is adapted to align said pivot links to engage said lock upon arrival of said lift deck in transport position and to break said links to disengage said lock upon initiation of descent of the lift deck toward loading position.

11. The combination defined in claim 10, and which further comprises:
   (a) means for disconnecting the lower ends of all but the rearmost of said hinge panels from the main frame to permit said lift deck to be tilted rearwardly for a dumping cycle;
   (b) means for extending said power lift means beyond the transport position to tilt said lift deck rearwardly for dumping and return same to transport position following the dumping cycle; and
   (c) means for controlling said power actuator to maintain said lock in engaged condition through the dumping cycle and upon return of said lift deck to transport position.

12. A tractor drawn trailer for use with pallet frame units adapted to carry high tonnage loads, said trailer comprising the combination of:
   (a) a main support frame including means for direct connection to a tractor;
   (b) a lift deck mounted in superimposed relation on said main frame and adapted to support a pallet frame unit;

(c) a plurality of hinge panels pivotally connected at their lower ends to said main support frame and at their upper ends to said lift deck constraining the latter to be raised and lowered in generally parallel relation with the former;

(d) single acting fluid actuator means for elevating said lift deck to raised transport position wherein each said hinge panel has been arrested approximately 5 degrees short of vertical orientation;

(e) valve means for draining pressure fluid from said single acting actuator means to cause said lift deck to descend by gravity to lowered loading position;

(f) uplock means including a pair of toggle links interposed between one said hinge panel and said lift deck, said pair of toggle links being pivotally interconnected;

(g) said pair of pivotally interconnected links being constructed and arranged so that they define a self-locking relationship when said lift deck is in a raised transport position, and can be shifted to an unlocked relationship to permit departure from said raised transport position toward lowered loading position; and (h) a power actuator for moving said links of said uplock means into and out of their self-locking relationship.

13. The combination defined in claim 12, in which said power actuator is a double acting fluid actuator for engaging and disengaging said uplock means.

14. The combination defined in claim 12, which further includes a depending buttress on said lift deck adapted to intercept one said hinge panel during upward arcuate movement thereof and thereby define raised transport position of said lift deck.

15. The combination defined in claim 14, which further comprises:

(a) a pair of laterally spaced locking sleeves mounted on the forward face of said one hinge panel and adapted to straddle said buttress when the latter engages said forward face of said hinge panel;

(b) means defining an aperture in said buttress adapted to register with said laterally spaced locking sleeves; and (c) a locking pin manually insertable in said sleeves and buttress aperture to maintain said lift deck in raised transport position in event of failure of the trailer hydraulic system.

* * * * *